Dec. 4, 1951  W. G. TOLAND  2,577,384
TRACTOR-MOUNTED TWO-WAY PLOW
Filed May 11, 1946  2 SHEETS—SHEET 2

Inventor:
Wayne G. Toland.
By Paul O. Pippel
Atty.

Patented Dec. 4, 1951

2,577,384

UNITED STATES PATENT OFFICE 2,577,384

TRACTOR-MOUNTED TWO-WAY PLOW

Wayne G. Toland, Canton, Ill., assignor to International Harvester Company, a corporation of New Jersey Application May 11, 1946, Serial No. 669,148

3 Claims. (Cl. 97—29)

This invention relates to agricultural implements and particularly to plows. More specifically the invention relates to a tractor-mounted two-way plow.

An object of the invention is to provide in an agricultural implement novel means for connecting the implement to a traveling support such as a tractor to be transported thereby.

Another object of the invention is to provide improved means for maintaining the alternately operable units of a tractor mounted two-way plow in transport position.

Another object of the invention is to provide a two-way plow mounted upon a supporting frame, comprising alternately operable plowing units, lifting mechanism for raising the units to transport position and latching mechanism independent of the lifting means for releasably holding the units in transport position.

Another object of the invention is to provide in a two-way plow mounted upon a tractor or other support wherein releasable latching means are provided for holding the units in transport position and lifting mechanism for raising the units, and wherein each unit is allowed to return by gravity to its operating position, optionally operable means for arresting the descent of the plowing unit to plowing position.

A further object of the invention is to provide in a two-way plow comprising alternately operable plowing units and lifting mechanism for raising the units to transport position, independently operable latching mechanism for holding the units in transport position including cooperating latching elements on the plowing unit and on the support operable upon raising the units to hold them in transport position.

Other objects and advantages of the invention will become clear from the following detailed description when read in conjunction with the accompanying drawings, wherein.

Figure 1:
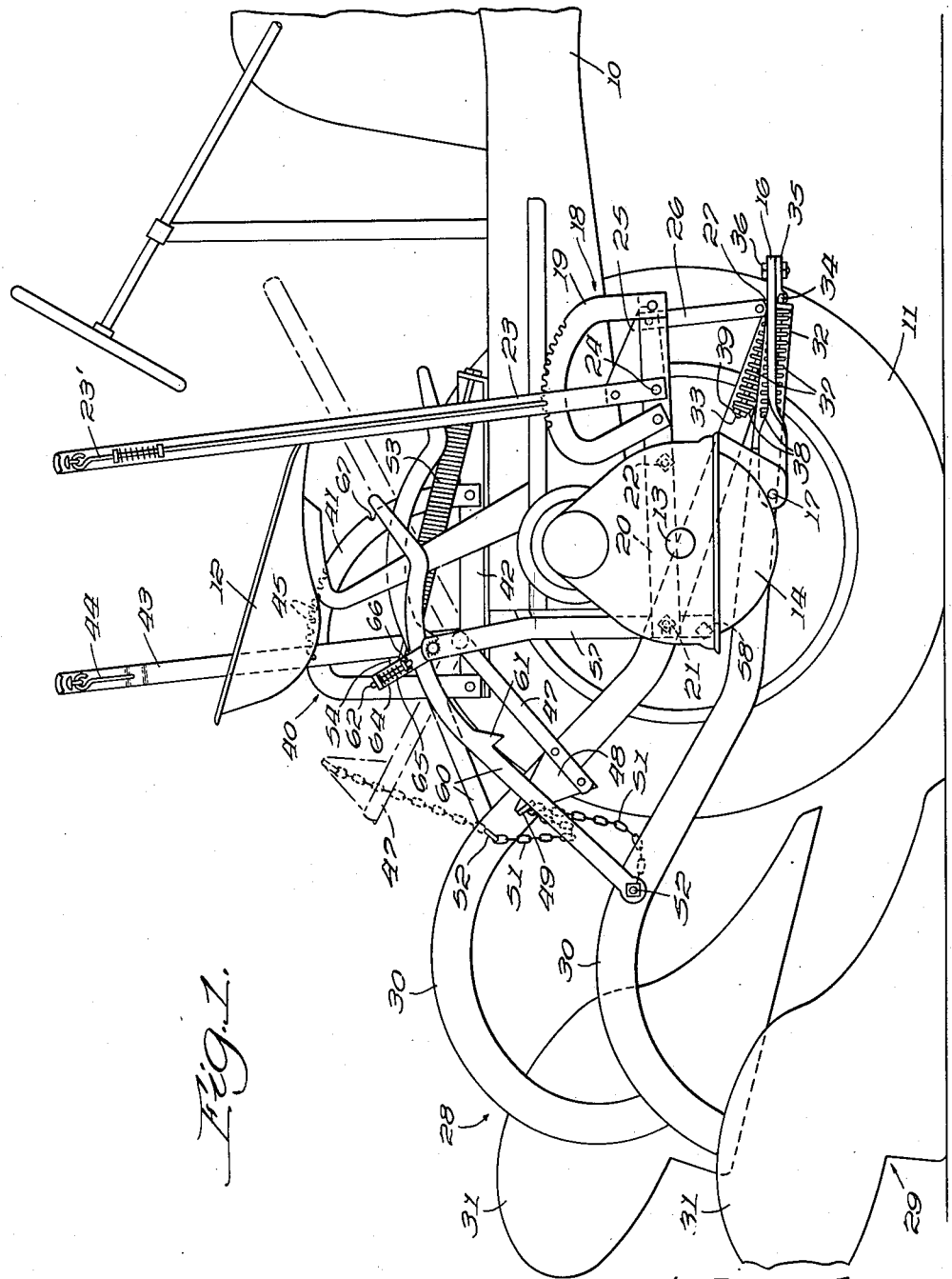
Figure 1 is a view in side elevation of the rear portion of a tractor, showing mounted thereupon a two-way plow embodying the features of the present invention.

In the drawings, it will be noted that the plow of the present invention is mounted upon a tractor having a laterally offset body 10, laterally spaced rear drive wheels 11, and an operator's seat 12. The drive wheels 11 are mounted on stub axles 13 in depending axle housings 14 carried by a transverse rear axle structure 15. Depending axle housings 14 serve as the attaching structure for a draw-bar 16 which is U-shaped and is pivotally connected at laterally spaced points to the depending axle housings 14, as indicated at 17, for generally vertical swinging movement. The draw-bar 16 is adjustably held against vertical movement by an adjusting mechanism indicated at 18 and including a notched quadrant 19 mounted upon a strap 20 secured to the depending axle housing 14 at the right-hand side of the tractor by bolts 21 and 22. An upwardly extending hand lever 23 is pivoted at 24 upon the strap 20, and has secured to its lower end a forwardly extending arm 25 which is pivotally connected by a link 26 with a lug 27 mounted upon the draw-bar 16. Lever 23 is provided with a detent mechanism 23' receivable in the notches in the quadrant 19 so that by movement of the lever 23 the draw-bar 16 may be adjusted up and down and held in its adjusted position.

Draw-bar 16 serves for the connection to the tractor of the forward ends of a pair of laterally spaced left- and right-hand plowing units 28 and 29 respectively. These units are substantially identical and each includes a longitudinally extending tool beam 30 which is curved downwardly at its rear end and has secured thereto a plow bottom 31. The plow bottoms 31 upon the left- and right-hand units 28 and 29 are conventional left- and right-hand plow structures for use on two-way plows. In such an implement the tractor travels back and forth across a field, and the left- and right-hand plowing units are alternately placed in operation so that the dirt dug up by the plow bottoms is always thrown in the same direction.

The forward end of each of the plow units 28 and 29 has secured to opposite sides thereof plates 32 which are bent outwardly at their forward ends and apertured to receive the rearwardly extending arms of a U-bolt 33 having a transverse portion 34 pivotally received in a bearing 35 affixed at an angle to the draw-bar 16 by bolts 36. The rearwardly extending arms of the bolt 33 extending through the apertures in the plates 32 are surrounded by springs 37 which abut against the bent portion of the plate 32 at one end and against a collar 38 at the other end held in place by a nut 39 on the threaded ends of the U-bolt. Each of the plow units is thus longitudinally movable relative to the draw-bar 16. The U-bolt 33 is slidable in the apertures in the plates 32 permitting the tool beam 30 to be moved longitudinally relative to the draw-bar 16 against the action of the springs 37, providing flexibility of the plowing units when obstructions are encountered during operation and thus avoiding injury thereto. This flexible hitch structure, by which each of the plow units 28 and 29 is connected to the draw-bar 16, forms no part of the present invention, and further details of the construction thereof may be had by reference to United States Patent No. 2,551,451.

Figure 2:
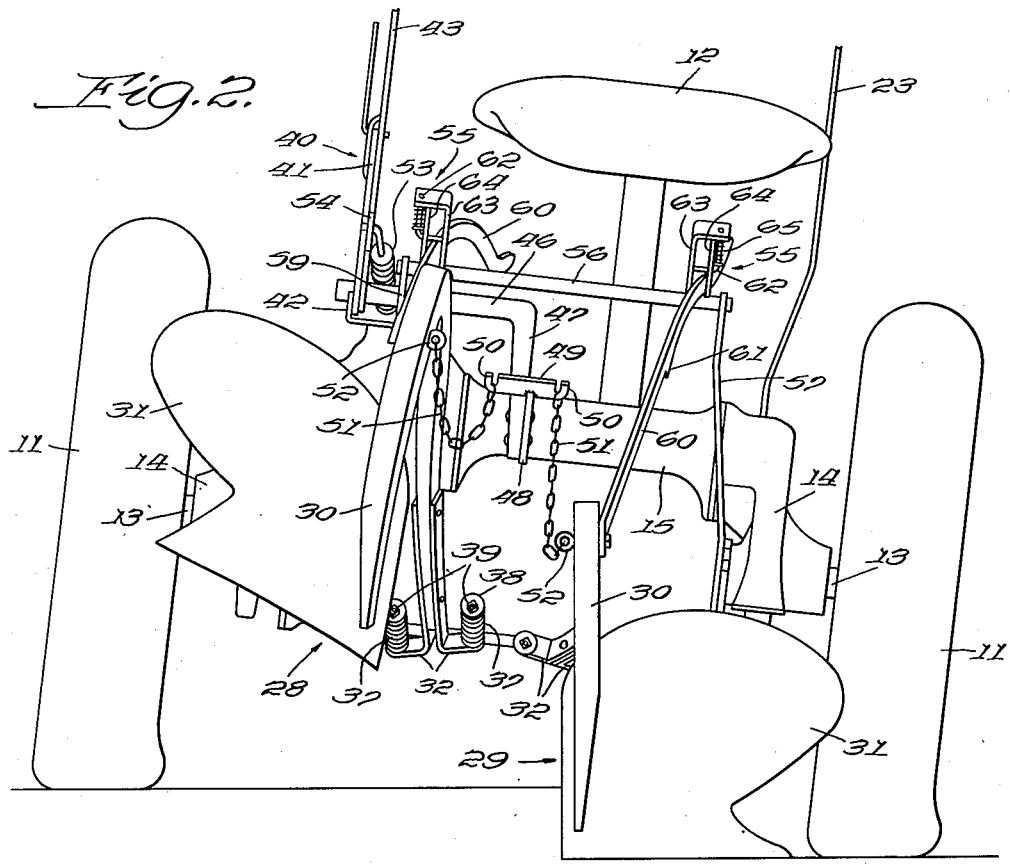
Figure 2 is a rear elevation of the tractor and plow structure shown in Figure 1.

The plowing units 28 and 29 are thus connected to the draw-bar 16 in draft-receiving relation to the tractor. In Figure 2 the right-hand plow bottom is shown in operating position opening a furrow in the soil. The depth of operation thereof in the soil is determined by the height of the front end of the tool beam 30 from the surface of the ground over which the tractor is traveling. Therefore, to vary the depth of operation of the plow bottom, the draw-bar 16 is swung vertically about its pivot at 17 to raise or lower the hitch point of the plow beam. This is accomplished as pointed out before by operation of the lever 23 over the quadrant 19.

The left- and right-hand plowing units 28 and 29 are adapted to be transported upon the tractor. For this purpose a lifting structure generally indicated at 40 is provided which includes a quadrant 41 mounted upon a bracket 42 secured to the rear axle housing of the tractor. Pivoted upon the bracket 42 and movable over the quadrant is a hand lever 43 having a detent mechanism 44 adapted to engage notches 45 in the quadrant. Affixed to the lower end of the lever 43 at its pivot upon the bracket 42 is a transversely extending crank 46 having a rearwardly bent arm portion 47 adapted for swinging movement in a generally vertical plane during movement of the lever 43 over the quadrant 41.

To the rear end of the arm portion 47 of the crank 46 is secured an upwardly extending triangular plate 48 having affixed as by welding to the upwardly projecting end thereof a transverse member 49 having a hook 50 at each end thereof serving for the attachment of one end of a flexible link in the form of a chain 51, the other end of which is connected to an eye-bolt 52 carried by the beam 30. Thus both of the plowing units 28 and 29 are operatively connected to the lifting mechanism 40 to be lifted by movement of the lever 43 over the quadrant 41. As shown in Figure 2, the right-hand plow unit 29 is in operating position opening a furrow in the soil while plow unit 28 is in transport position. It is clear, of course, that since both of the plow units are connected to the same lifting mechanism, they may both be raised simultaneously to transport position or lowered to operating position, or that either unit which is in operating position will be raised to transport by means of the hand lever 43. Lifting of the plow units is assisted by a spring 53 which is connected to one end of the bracket 42 and to a lug 54 secured to the lower portion of the lever 43. This spring serves to bias movement of the lever 43 in a forward direction to raise the plow units.

Figure 3:
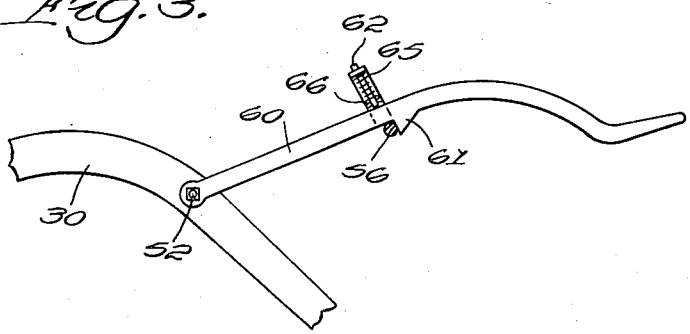
Figure 3 is a detail of the latching mechanism by which the plow units are held in transport position.

The plow units are held in their transport position by a latch mechanism generally indicated at 55, one such latch mechanism being provided for each of the plow units 28 and 29. This latch mechanism includes a transverse shaft 56 having its right-hand end secured as by welding to the upper end of a vertically extending strap 57, the lower end of which is secured by bolts 21 and 58 to the right-hand depending axle housing 14. The left-hand end of shaft 56 is secured to a post 59 affixed to the bracket 42. Pivotally mounted upon each of the eye-bolts 52 passing through the beams 30 is a latch tongue 60 which is adapted to rest upon the upper surface of the transverse shaft 56 and is provided with a hook-like projection 61 arranged to engage the shaft 56 when the plow unit is raised to transport position, as indicated clearly in Figure 3. Since each of the tool beams 30 is provided with a latch tongue 60 and each is independently engageable with the transverse shaft 56, the two plowing units may be raised simultaneously or alternately and locked in raised position. Each of the latch tongues 60 is held resiliently against the shaft 56 and its hook 61 in engagement therewith by a spring biased latching element including a generally vertically extending pin 62 having its lower end bent transversely to pass through alined openings in laterally spaced generally vertically extending plates 63 and 64 affixed at their lower ends to the shaft 56. Plate 63 has its upper end bent laterally and apertured at its end to receive for sliding movement the upper end of the pin 62. A spring 65 surrounds this portion of the pin and has its upper end bearing against the laterally bent portion of the plate 63 and its lower end abutting against a cotter key 66 passed through the pin. The action of the spring 65 urges the pin 62 against the upper surface of the latch tongue 60 and presses it against the shaft 56. When the unit has been raised to transport position as indicated with the left-hand unit in Figure 2, the hook-like projection 61 is maintained in operative engagement with the shaft 56 to prevent the plow unit from returning to working position. To release the latch and permit the plow unit to return to working position, the operator from his station 12 on the tractor merely grasps the forward end of the latch tongue 60 and lifts it against the action of the spring 65 until the hook 61 clears the shaft 56. The plow unit then drops by gravity to working position.

In normal operation of the two-way plow of the present invention through relatively soft ground, the plow unit in operating position is raised by releasing the detent 44 associated with the lever 43 and pushing the lever forward over the quadrant 41. In Figure 1 it will be noted that the lower portion of the sector or quadrant 41 is relatively free of notches, the notches 45 being provided in the upper end of the quadrant. Upon forward movement of the lever 43 to a position such as indicated in dotted lines in Figure 1, the working plow unit is raised until its associated latching mechanism becomes effective to hold the unit in its transport position. Thereupon the operator immediately returns the lever 43 to the position shown in solid lines in Figure 1 which corresponds to the working position of the implement. This operation of lifting the operating plow unit occurs every time that the tractor is turned to reverse the direction of travel of the implement, so that upon turning the tractor both plowing units are temporarily in transport position. Upon reversing the direction of travel the appropriate plowing unit is then released by the operator grasping the end of the latch tongue 60 to release the hook 61 from engagement with the shaft 56 and permit the plowing unit to fall by gravity. The hand lever 43 is then, of course, in position for another lifting operation when the other end of the field is reached and another turn must be made.

While the foregoing is the procedure when normally soft ground is being plowed, conditions such as the presence of rocks and the like may be expected to damage the plow bottom 31 when it is dropped by gravity to operating position. In order to avoid this likelihood of injury to the plow bottom, when plowing in hard or rocky soil the operator upon reaching the end of the field to reverse the direction thereof grasps the lever 43 and pushes it forwardly to the position indicated in dotted lines in Figure 1. At this point the latching mechanism 55 of the raised plow unit has effectively engaged the shaft 56 and the unit will not return to working position until released by the operator. The lever 43 is left in the dotted line position until the turn is made, whereupon the operator grasps the latching tongue 60 of the appropriate plow bottom and releases it. The detent mechanism 44 of the lever 43 rides over the smooth surface of the lower portion of quadrant 41 under the drag of the falling plow unit. However, in order to prevent the plow unit falling and possible injury to the plow bottom 31 thereby, a notch 67 is provided in the lower portion of the quadrant to engage the detent mechanism 44 and prevent the plow bottom returning to working position even though the latch 55 has been released. The operator then grasps the lever 43 and eases the plowing unit down to its working position without danger of injury to the plow bottom.

The operation of the two-way plow of the present invention should be clear from the foregoing description. Modifications may, of course, be made therein without departing from the spirit of the invention or the scope of the appended claims.

What is claimed is:

1. An agricultural implement comprising a supporting frame, a tool-carrying beam connected to the frame for generally vertical movement and adapted to be lifted to transport position and dropped by gravity to operating position, a lever mounted on the frame, connecting means between the lever and the tool beam, said lever being movable from one position to another to raise the beam, latch means operable independently of the lever for locking the beam in raised position and releasable to permit the beam to fall by gravity to operating position, and releasable stop means associated with the lever automatically operable after an initial downward movement of the beam past the latching position and arranged to maintain said beam in raised position upon release of the latch.

2. An agricultural implement comprising a supporting frame, a tool-carrying beam connected to the frame for generally vertical movement and adapted to be lifted to transport position and dropped by gravity to operating position, a lever fulcrumed on the frame, connecting means between the lever and the tool beam for raising and lowering the latter, said lever being freely movable by the gravity pull of the tool beam between a raised and a lowered position, latch means operable independently of the lever for locking the beam in raised position and releasable to permit the beam to fall by gravity to operating position, and releasable stop means automatically operable after an initial downward movement of the beam past the latching position and arranged to engage the lever in a position thereof corresponding to a raised position of the beam upon release of said latch means to prevent the accidental return of the lever by the gravity pull of the raised plow beam, whereby the danger of injury to the tool is avoided.

3. In a two-way plow, a supporting frame, a pair of right and left hand plow units connected to the frame for independent movement with respect thereto between operating and transport positions, a lever fulcrumed on the frame, a flexible connection between each said unit and said lever whereby said units may be raised and lowered simultaneously, said lever being freely movable by the gravity pull of the plow units between a raised and a lowered position, latch means acting between each unit and the frame and operable independently of the lever for locking the units in raised position, each latch being releasable to permit the associated unit to fall by gravity to operating position, and releasable stop means arranged to engage the lever in a position thereof corresponding to a raised position of the unit upon release of said latch means to prevent the accidental return of the lever by the gravity pull of the raised unit, whereby the danger of injury to the tool is avoided.

WAYNE G. TOLAND.

REFERENCES CITED

The following references are of record in the file of this patent:

UNITED STATES PATENTS

| Number | Name | Date |
|---|---|---|
| 435,513 | McGuire | Sept. 2, 1890 |
| 1,089,213 | Hallbauer | Mar. 3, 1914 |
| 1,262,304 | Carpenter | Apr. 9, 1918 |
| 1,302,339 | Esping | Apr. 29, 1919 |
| 1,333,207 | Johnson | Mar. 9, 1920 |
| 1,362,277 | Watson | Dec. 14, 1920 |
| 1,381,662 | Reynolds | June 14, 1921 |
| 1,630,576 | Monson | May 31, 1927 |
| 1,670,270 | Monson | May 15, 1928 |
| 1,717,804 | Monson | June 18, 1929 |
| 1,922,222 | Strandlund et al. | Aug. 15, 1933 |
| 2,012,458 | Strandlund | Aug. 27, 1935 |
| 2,070,964 | Scott | Feb. 16, 1937 |
| 2,324,840 | Hipple | July 20, 1943 |
| 2,344,271 | Scott et al. | Mar. 14, 1944 |
| 2,354,084 | Geraldson | July 18, 1944 |
| 2,457,163 | Lansing | Dec. 28, 1948 |

FOREIGN PATENTS

| Number | Country | Date |
|---|---|---|
| 691,630 | France | July 15, 1930 |
| 233,399 | Germany | Apr. 8, 1911 |
| 308,847 | Great Britain | Apr. 4, 1929 |
| 30,088 | Sweden | Jan. 7, 1911 |